United States Patent [19]
Freedenberg et al.

[11] Patent Number: 5,448,410
[45] Date of Patent: Sep. 5, 1995

[54] VARIABLE MAGNIFICATION LASER IMAGING SYSTEM

[75] Inventors: Candace J. Freedenberg, Holly Ridge, N.C.; Frederick A. Herring, Wappingers Falls; Uldis A. Ziemins, Poughkeepsie, both of N.Y.

[73] Assignee: International Business Machines Corporation, Armonk, N.Y.

[21] Appl. No.: 923,284

[22] Filed: Jul. 31, 1992

[51] Int. Cl.$^6$ ............................................. G02B 15/14
[52] U.S. Cl. .................................. 359/676; 359/683
[58] Field of Search ...................... 359/676, 679, 683

[56] References Cited

U.S. PATENT DOCUMENTS

| | | | |
|---|---|---|---|
| 4,353,617 | 10/1982 | Tokumitsu et al. | 359/676 |
| 4,376,303 | 3/1983 | Lurie | 359/676 |
| 4,757,354 | 7/1988 | Sato et al. | 355/53 |
| 4,937,424 | 6/1990 | Yasui et al. | 219/121.6 |

OTHER PUBLICATIONS

IBM Technical Disclosure Bulletin, vol. 33, No. 4, Sep. 1990, pp. 206 & 207 'Excimer Laser Objective Lens' by F. A. Herring et al.

Primary Examiner—Scott J. Sugarman
Attorney, Agent, or Firm—Aziz M. Ahsan; Floyd A. Gonzalez

[57] ABSTRACT

A train of air spaced optical mechanisms capable of taking a raw laser beam and focusing it on a workpiece for a range of cut sizes with varying magnifications and energy densities while controlling divergence and providing optimum uniformity. The lenses are diffraction limited for optimum uniformity and edge definition. The system uses variable down collimators to condense the beam to an aperture plane. The aperture is then imaged to the workpiece with Barlow, zoom transfer, collimator, and objective lenses. The components are color corrected to aid in alignment of an invisible beam and allow the aperture to be imaged to a workpiece in visible light.

17 Claims, 11 Drawing Sheets

FIG. 3

| SURFACE | RADIUS (mm) | THICKNESS (mm) | CLEAR APERT (mm) | GLASS | INDEX .3080μ | INDEX .6328μ |
|---|---|---|---|---|---|---|
| 201 | 92.0 | | | | | |
| 202 | -86.470 | 5.0 | 20.0 | $CaF_2$ | 1.45255 | 1.43289 |
| 203 | -81.250 | 2.50 | 20.0 | | | |
| 204 | -500.00 | 2.50 | 19.0 | $SiO_2$ | 1.48564 | 1.45702 |
| 205 | PLANE | 84.520 | 20.0 | | | |
| 206 | 46.010 | 2.0 | | $SiO_2$ | 1.48564 | 1.45702 |

FIG. 5

| SURFACE | RADIUS (mm) | THICKNESS (mm) | CLEAR APERT (mm) | GLASS |
|---|---|---|---|---|
| 401 | -125.00 | | 10.5 | |
| 402 | 47.00 | 3.0 | 10.5 | $CaF_2$ |
| 403 | 47.00 | 1.0 MIN, 20.0 MAX | 9.0 | |
| 404 | -47.00 | 1.50 | 9.0 | $SiO_2$ |
| 405 | -47.00 | 1.00 | 10.5 | |
| 406 | 125.00 | 3.00 | 10.5 | $CaF_2$ |

FIG. 7

| SURFACE | RADIUS (mm) | THICKNESS (mm) | CLEAR APERT (mm) | GLASS | INDEX .3080μ | INDEX .5876μ | INDEX .6328μ | $V_D$ |
|---|---|---|---|---|---|---|---|---|
| 601 | 37.590 | | 14.00 | | | | | |
| 602 | -16.960 | 3.0 | 15.00 | CaF$_2$ | 1.45255 | 1.43385 | 1.43289 | 99.74 |
| 603 | -17.750 | 0.50 | 16.00 | | | | | |
| 604 | PLANE | 6.0 | 16.00 | QUARTZ | 1.48564 | 1.45846 | 1.45702 | 71.41 |

FIG. 9

| SURFACE | RADIUS (mm) | THICKNESS (mm) | CLEAR DIAM (mm) | MATERIAL |
|---|---|---|---|---|
| 801 | -22.000 | 35.00 | 12.00 | AIR |
| 802 | 18.500 | 1.25 | 15.00 | QUARTZ |
| 803 | 20.500 | 0.40 MIN, 2.50 MAX | 15.00 | AIR |
| 804 | -18.500 | 3.80 | 15.00 | CaF$_2$ |
| 805 | 18.500 | 1.50 | 15.00 | AIR |
| 806 | -20.500 | 3.80 | 15.00 | CaF$_2$ |
| 807 | -18.500 | 0.40 | 12.00 | AIR |
| 808 | 230.000 | 1.50 | 15.00 | QUARTZ |
| IMAGE PLANE | | 51.68 | 15.00 | AIR |

FIG. 11

| SURFACE | RADIUS (mm) | THICKNESS (mm) | CLEAR DIA. (mm) | MATERIAL |
|---|---|---|---|---|
| 1001 | -609.310 | 312.62 | 28.00 | |
| 1002 | -48.600 | 3.10 | 25.00 | QUARTZ |
| 1003 | -48.420 | 0.50 | 28.00 | |
| 1004 | 154.830 | 6.20 | 28.00 | $CaF_2$ |

FIG. 13

| SURFACE | RADIUS (mm) | THICKNESS (mm) | CLEAR DIA. (mm) | MATERIAL |
|---|---|---|---|---|
| 1201 | 83.230 | | 30.00 | |
| 1202 | -32.070 | 6.50 | 30.00 | $CaF_2$ |
| 1203 | -29.510 | 0.38 | 27.00 | AIR |
| 1204 | 359.320 | 2.00 | 30.00 | $SiO_2$ |
| 1205 | 36.530 | 0.38 | 26.00 | AIR |
| 1206 | -162.200 | 5.00 | 26.00 | $CaF_2$ |
| 1207 | 22.500 | 0.50 | 24.00 | AIR |
| 1208 | -54.470 | 6.00 | 24.00 | $CaF_2$ |
| 1209 | -72.920 | 0.40 | 24.00 | AIR |
| 1210 | 15.710 | 1.50 | 19.00 | $BaF_2$ |
| 1211 | 15.720 | 4.00 | 12.73 | AIR |
| 1212 | -15.680 | 4.00 | 19.00 | AIR |
| 1213 | 22.500 | 1.50 | 21.00 | $SiO_2$ |
| 1214 | 24.015 | 0.43 | 21.00 | AIR |
| 1215 | -18.640 | 6.50 | 21.00 | $CaF_2$ |
| 1216 | 59.200 | 0.40 | 21.00 | AIR |
| 1217 | 18.640 | 2.00 | 19.00 | $BaF_2$ |
| 1218 | 18.710 | 0.55 | 21.00 | AIR |
| 1219 | -47.290 | 6.00 | 21.00 | $CaF_2$ |
| 1220 | PLANE | 1.50 | 30.00 | AIR |
| 1221 | PLANE | 3.18 | 30.00 | $SiO_2$ |
| IMAGE PLANE | | 27.97 | 37.43 | AIR |

FIG. 14

| $D_7$ WITHOUT BARLOW | MAGNIFICATION TRANSFER LENS | $D_{13}$ | $D_{19}$ | $D_{TR}$ | SYSTEM MAGNIFICATION |
|---|---|---|---|---|---|
| 285.625 | 6.00X | 0.40 | 363.50 | 15.25 | 34.70X |
| 287.950 | 6.86X | 1.00 | 359.32 | 16.00 | 38.42X |
| 290.950 | 7.42X | 1.50 | 356.62 | 16.50 | 41.72X |
| 291.950 | 7.99X | 2.00 | 354.32 | 17.00 | 44.62X |
| 293.450 | 8.55X | 2.50 | 352.32 | 17.50 | 47.89X |

FIG. 15

| $D_{11}$ WITH BARLOW | MAGNIFICATION TRANSFER LENS | $D_{13}$ | $D_{19}$ | $D_{TR}$ | SYSTEM MAGNIFICATION |
|---|---|---|---|---|---|
| 249.184 | 6.00X | 0.40 | 363.50 | 15.25 | 76.56X |
| 253.310 | 6.86X | 1.00 | 359.32 | 16.00 | 85.42X |
| 255.510 | 7.42X | 1.50 | 356.62 | 16.50 | 92.25X |
| 257.310 | 7.99X | 2.00 | 354.32 | 17.00 | 99.51X |
| 258.810 | 8.55X | 2.50 | 352.32 | 17.50 | 106.50X |

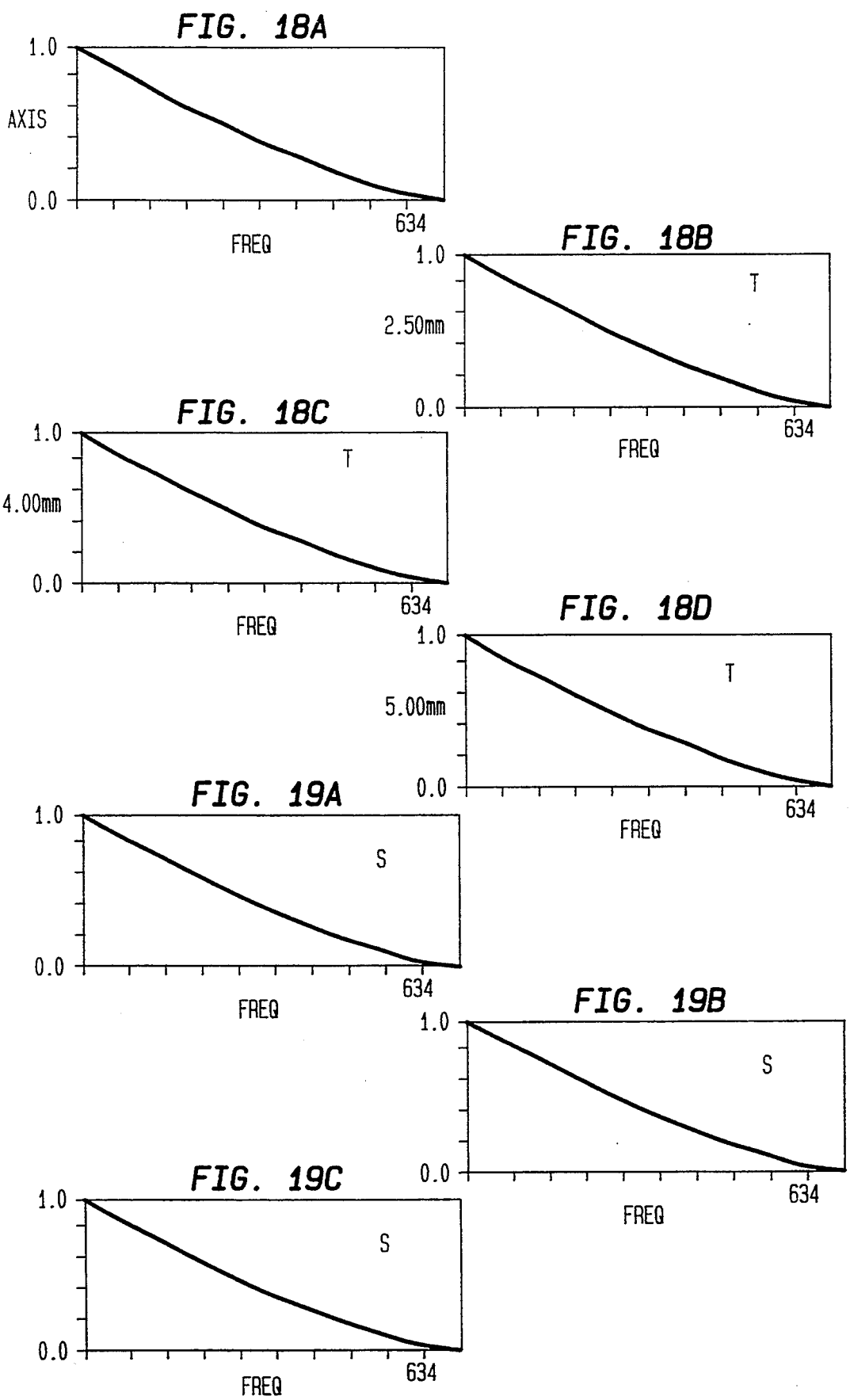

VARIABLE MAGNIFICATION LASER IMAGING SYSTEM

The present invention generally relates to a beam delivery system and more particularly relates to a beam delivery system for focusing a laser beam on a workpiece for making a range of cut sizes with varying magnification and energy densities for micro-machining operations.

BACKGROUND OF THE INVENTION

U.S. Pat. No. 4,757,354 issued Jul. 12, 1988 to Sato et al. for Projection Optical System discloses a projection optical system including refraction sub-system and a cata-dioptric subsystem optically connected to each other and is used for photolithography used in producing integrated circuits, large-scale circuits, or the like.

U.S. Pat. No. 4,937,424 issued Jun. 26, 1990 to Yasui et al. for Laser Machining Apparatus discloses a laser machining apparatus including a laser resonator capable of producing a laser beam having a filled-in intensity distribution pattern and a condensing device for converting the beam into a suitable beam to perform an intended machining.

SUMMARY OF THE INVENTION

The present invention is an imaging system which shapes a raw laser beam and impinges it to an aperture, controls the divergence output from the laser through the aperture plane to imaging lenses to provide an optical train which accepts angular pointing errors of plus or minus three minutes of arc. The imaging system maintains color correction between two octaves of light, provides minimal aberrations, and further provides a magnification range of about 35 × to about 105 × within a constant total working distance to achieve a range of energy densities and cut sizes required for micro-machining with a minimal input laser power. A wide range of desired cut parameters is achieved with the minimum input power of 1-2 watts while maintaining optimum cut uniformity and edge definition.

It is an object of the present invention to provide a laser micro-machining apparatus which can accommodate lasers having different divergences.

It is another object of the present invention to provide a laser imaging system which is color corrected such that various wavelengths are focused at the same point.

It is another object of the present invention to provide a laser micro-machining apparatus which provides various energy densities and sizes of cuts.

It is another object of the present invention to provide a laser micro-machining apparatus wherein the energy density of its cut size is a function of its aperture setting size and the demagnification of its lens system.

The foregoing and other objects, features and advantages of the invention will be apparent from the following more particular description of the preferred embodiment of the invention as illustrated in the drawings.

BRIEF DESCRIPTION OF THE INVENTION

FIG. 3 is a table of the prescription of the beam shaping lens of FIG. 2;

FIG. 5 is a table of the prescription of the variable field lens of FIG. 4;

FIG. 7 is a table of the prescription of the Barlow lens of FIG. 6;

FIG. 9 is a table of the prescription of the zoom transfer lens of FIG. 8;

FIG. 11 is a table of the prescription of the collimator of FIG. 10;

FIG. 13 is a table of the prescription of the objective lens of FIG. 12;

FIG. 14 is a table showing the magnification of the system resulting from various spacings of the lens groups of the laser imaging system of the embodiment of FIG. 1;

FIG. 15 is a table showing the magnification of the system resulting from various spacings of the lens groups of another embodiment of the invention wherein the Barlow lens of FIG. 6 is omitted from the configuration shown in FIG. 1;

FIGS. 18A–18D are graphs showing the diffraction modulation transfer function of the present invention on the optical axis, and tangentially off axis at 2.50 mm, 4.00 mm, and 5.00 mm, respectively, at a defocus of −0.01 mm; and FIGS. 19A–19C are graphs showing the diffraction modulation transfer function of the present invention for sagittal measurements taken at 2.50 mm off axis, 4.00 mm off axis, and 5.00 off axis, respectively, at a defocus of −0.01 mm.

DESCRIPTION OF THE PREFERRED EMBODIMENT

Figure 1:
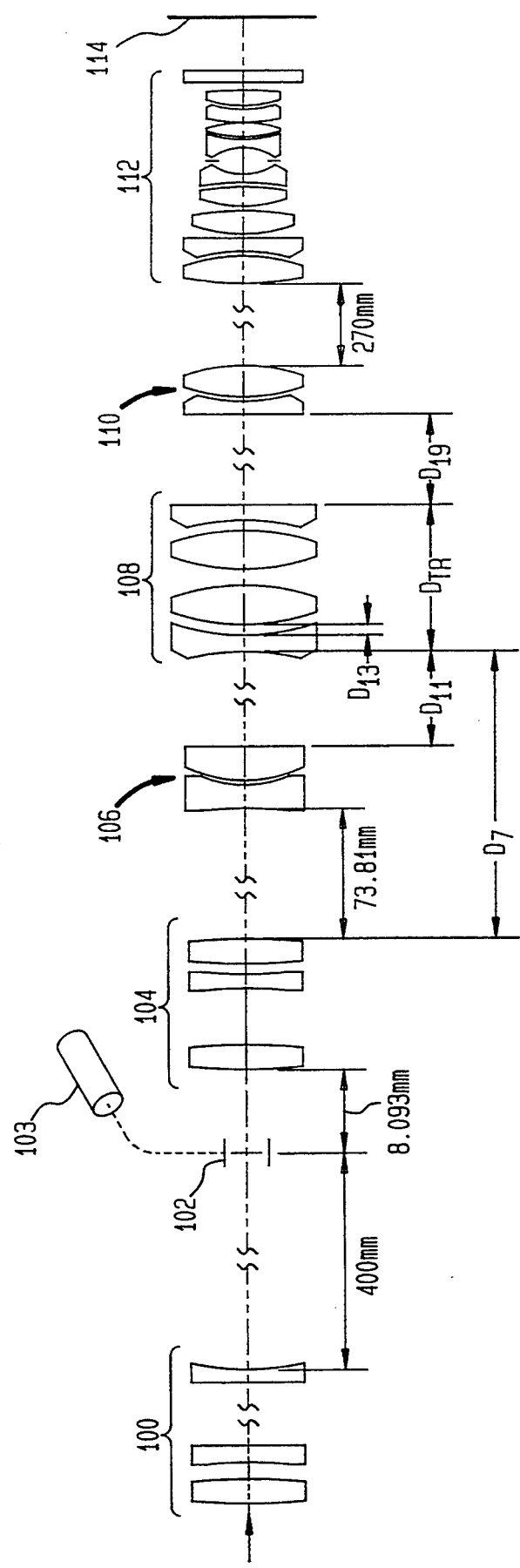
FIG. 1 is a diagram of the laser imaging system of one embodiment of the present invention.

FIG. 1 is a diagram of the laser imaging system of the present invention. It will be understood that a laser, not shown, is located at the left of the laser imaging system of FIG. 1, and that a workpiece to be micro-machined is located on an image plane 114. The laser to be used with the present imaging system may be any number of known lasers, such as an Excimer laser, having an output in the order of 1-2 watts. The present imaging system is designed to work with a variety of lasers having varying angles of divergence in the order of plus or minus 5 milliradians. The imaging system of the present invention is color corrected between two octaves of light, and is also corrected with minimum aberrations. These attributes allow the system to be used off the shelf lasers which produce beams of varying divergences. It will be understood that since the imaging system of the present invention is color corrected, light of different wavelengths will focus at the same spot. Therefore, light in the visible spectrum may be used to align the imaging system to the work piece at the image plane 114, and then light in an invisible spectrum (such as ultra violet) may be used to do the micro-machining on the work piece. Lasers usable with the present invention are well known by those skilled in the art, and will not be discussed further.

Figure 2:
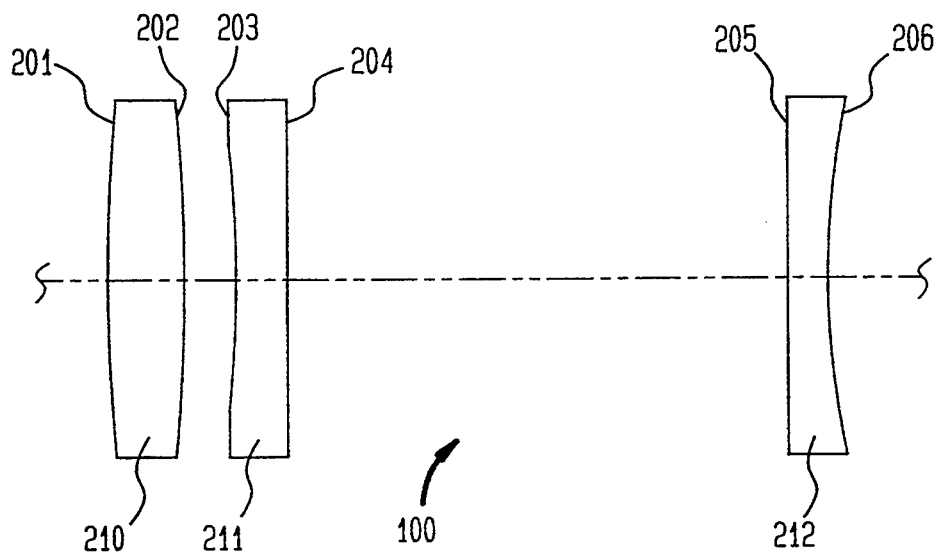
FIG. 2 is a diagram of a beam shaping lens of the laser imaging system of FIG. 1.

The imaging system of FIG. 1 includes a beam shaping lens 100 which reduces the laser beam size by about two times to a partially collimated beam which impinges on an aperture 102 to define the beam. The design of the beam shaping lens 100 is shown in FIGS. 2 and 3. The lens 100 has three elements, element 210 having surfaces 201 and 202, element 211 having surfaces 203 and 204, and element 212 having surfaces 205 and 206. The thickness shown in FIG. 3 refers to the thickness in the material from the previous entry in the table of FIG. 3. For instance, the thickness of the glass between surfaces 201 and 202 is 5.0 mm, as shown in the entry in the table for the surface 202. The remaining tables are constructed in the same way.

The aperture 102 may be motor driven by a stepper motor 103 to provide a defining member which is easily controlled between exact stops, as is well known.

Figure 4:
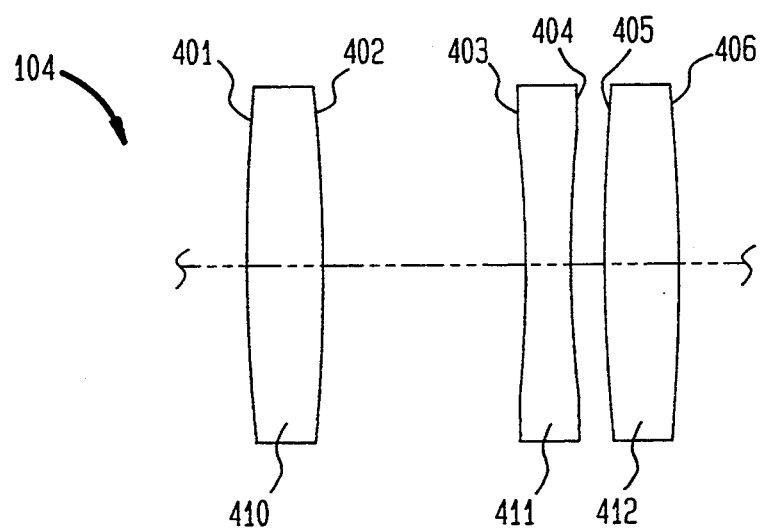
FIG. 4 is a diagram of a variable field lens of the laser imaging system of FIG. 1.

The distance between the beam shaping lens 100 and the aperture 102 is in the order of about 400 mm. Since the marginal rays outputted from the beam shaping lens 100 are partially collimated, the exact distance is not critical and may be varied to accommodate the linear distance available for the system. Next in the optical path of the system after the aperture 102 is a variable field lens 104. The design of the variable field lens 104 is shown in FIGS. 4 and 5, and has three lens elements 410, 411 and 412. As shown in the table of FIG. 5, the element 410 has surfaces 401 and 402, the element 411 has surfaces 403 and 404, and the element 412 has surfaces 405 and 406. The elements 411 and 412 are separated by 1.00 mm and are movable as a unit in relation to element 410. The distance between surfaces 402 and 403 of elements 410 and 411, respectively, may be from 1.0 mm to 20.0 mm, depending on the intrinsic output divergence of the laser used. Further details of the variable field lens are disclosed in copending patent application Ser. No. 07/923,207, filed on Jul. 31, 1992 entitled "Variable Focus Color Corrected Field Lens, owned by the assignee of the present application.

Figure 6:
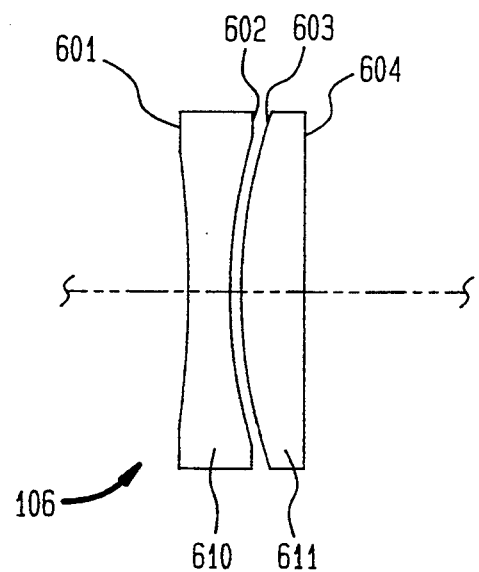
FIG. 6 is a diagram of a Barlow lens of the laser imaging system of FIG. 1.

Next in the optical path of the system after the variable field lens 104, is a Barlow lens 106 whose design is shown in FIGS. 6 and 7. When the variable field lens 104 is set for a laser divergence of 0, the distance between the field lens 104 and the Barlow lens 106 is 73.81 mm. As shown in FIGS. 6 and 7, the Barlow lens 106 has two elements 610 and 611. The element 610 has surfaces 601 and 602, and the element 611 has surfaces 603 and 604. The Barlow lens 106 demagnifies the image of the aperture from the variable field lens 104 by 2 ×.

Figure 8:
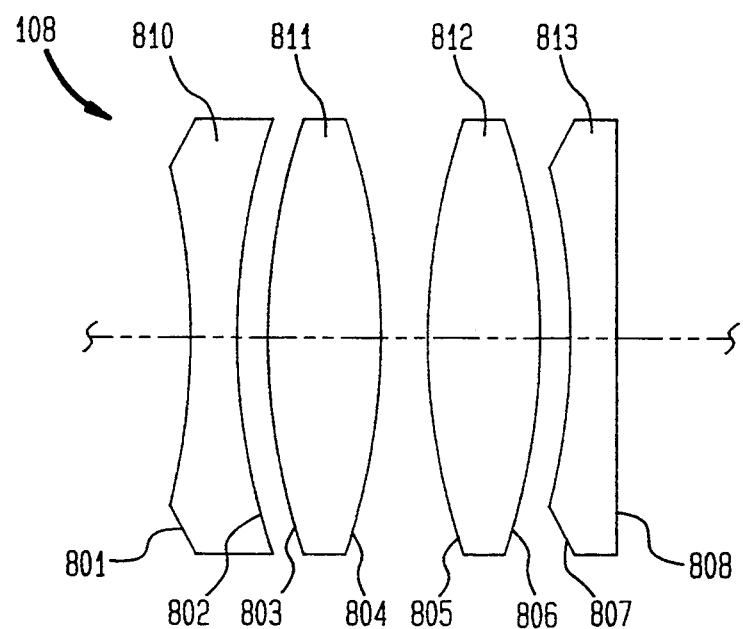
FIG. 8 is a diagram of zoom transfer lens of the laser imaging system of FIG. 1.

A thin zoom transfer lens 108 is in the optical path of the system after the Barlow lens 106. The design of the transfer lens 108 is shown in FIGS. 8 and 9. The thin zoom transfer lens 108 provides the system with a range of magnification to enable production of various cut sizes and required energy densities. The transfer lens 108 meets all of the mechanical and optical requirements with $CaF_2$ glass elements reduced in thickness to ensure that the lens 108 will withstand greater energy.

The thin zoom transfer lens 108 has four elements, element 810 having surfaces 801 and 802, element 811 having surfaces 803 and 804, element 812 having surfaces 805 and 806, and element 813 having surfaces 807 and 808. Elements 811, 812 and 813 are movable as a unit with respect to element 810 such that the distance between surfaces 802 and 803 varies from between 0.40 mm to 2.50 mm, thereby changing the magnification of the transfer lens 108 from 6 × to 8.9 ×, respectively. The first thickness entry in FIG. 9 (35.00 mm) is the distance from the entrance pupil of the lens 108.

Figure 10:
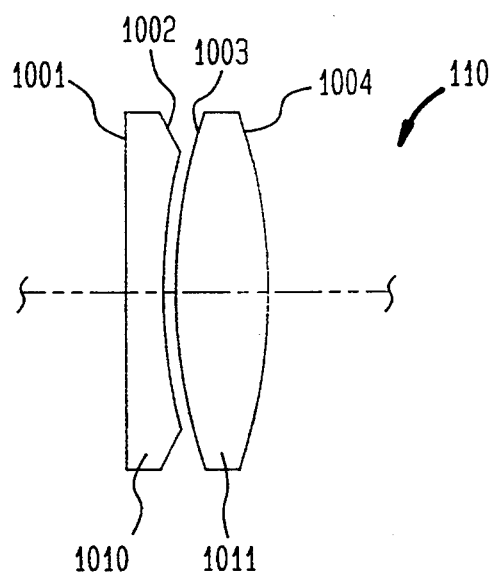
FIG. 10 is a diagram of a collimator of the laser imaging system of FIG. 1.

A telephoto type collimator 110 is in the optical path of the system after the transfer lens 108. The collimator 110 has a focal length of 320.12 mm. Its design is shown in FIGS. 10 and 11. The collimator 110 has two elements, element 1010 having surfaces 1001 and 1002, and element 1011 having surfaces 1003 and 1004. The collimator 110 picks up the intermediate image formed by the transfer lens 108 at its back focal point, collimating the beam.

Figure 12:
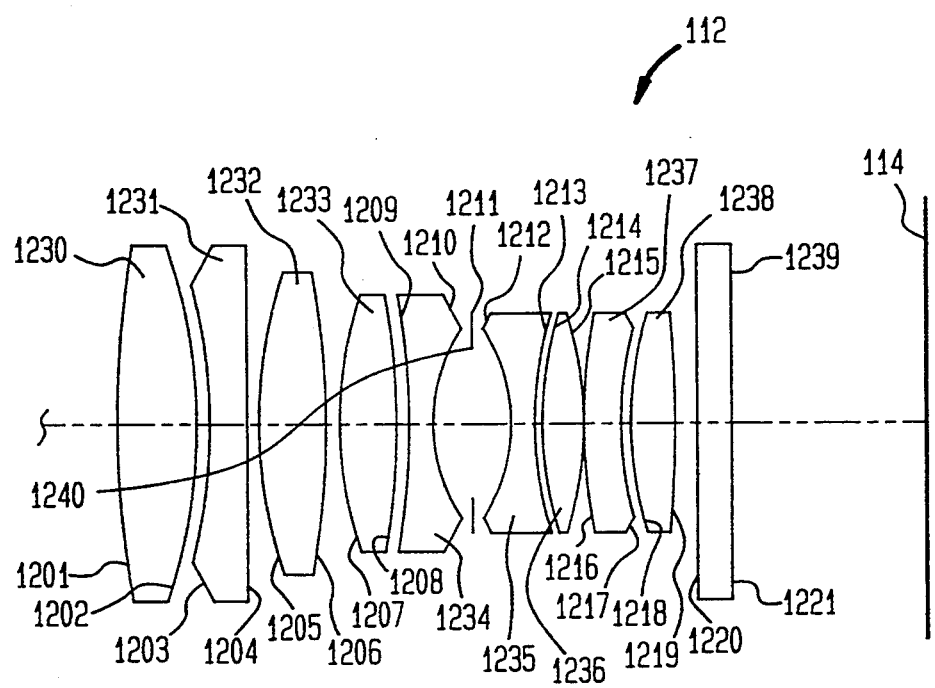
FIG. 12 is a diagram of an objective lens of the laser imaging system of FIG. 1.
Figure 16A:
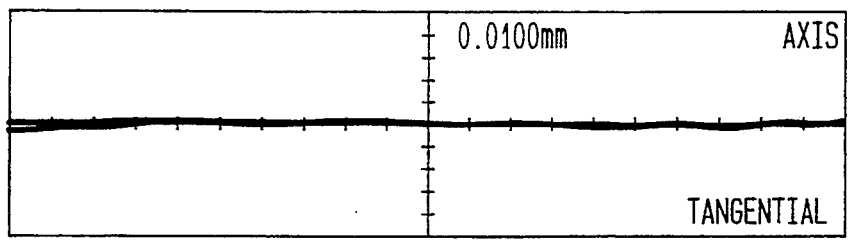
FIGS. 16A–16D are graphs showing transverse ray aberrations of the present invention for tangential measurements taken on the optical axis, 2.50 mm off axis, 4.00 mm off axis, and 5.00 mm off axis, respectively, at a defocus of −0.01 mm.
Figure 16B:
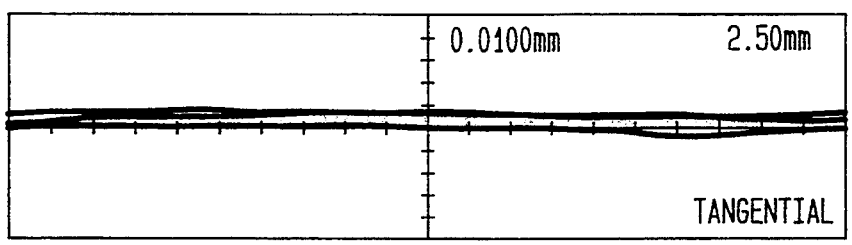
Figure 16C:
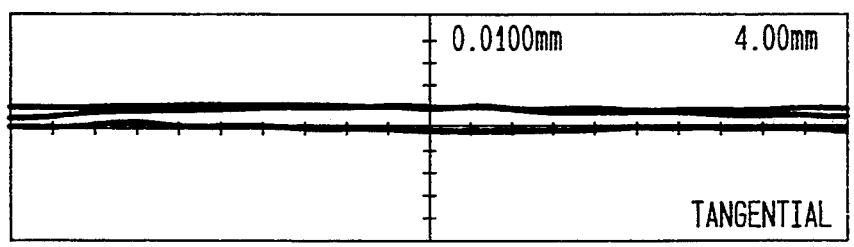
Figure 16D:
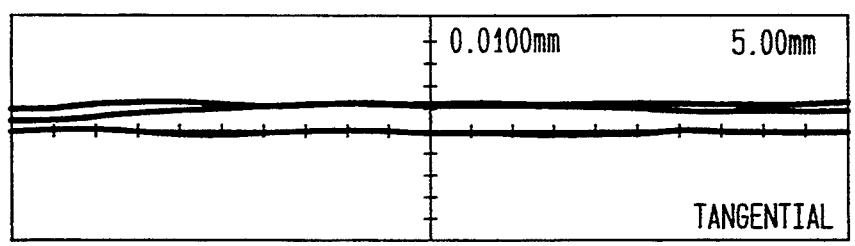
Figure 17A:
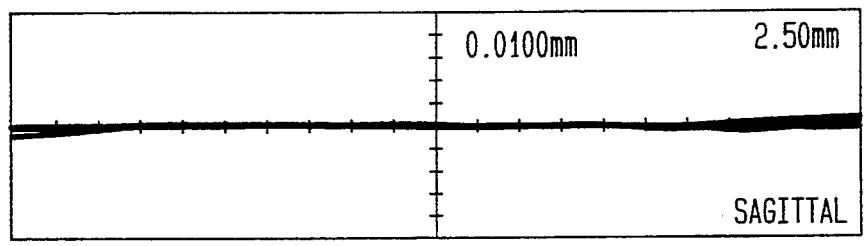
FIGS. 17A–17C are graphs showing transverse ray aberrations of the present invention for sagittal measurements taken at 2.50 mm off axis, 4.00 mm off axis, and 5.00 mm off axis, respectively, at a defocus of −0.01 mm.
Figure 17B:
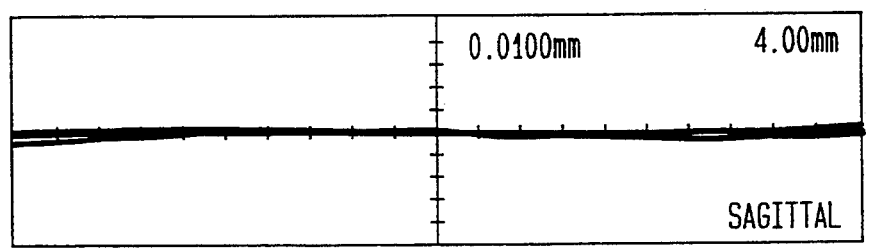
Figure 17C:
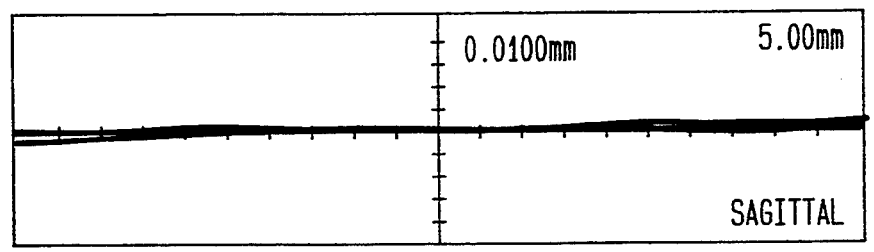

A ten element objective lens 112 is in the optical path of the system after the collimator 110. The design of the objective lens 112 is shown in FIGS. 12 and 13. In the objective lens 112, an element 1230 has surfaces 1201 and 1202, element 1231 has surfaces 1203 and 1204, element 1232 has surfaces 1205 and 1206, element 1233 has surfaces 1207 and 1208, element 1234 has surfaces 1209 and 1210, element 1235 has surfaces 1212 and 1213, element 1236 has surfaces 1214 and 1215, element 1237 has surfaces 1216 and 1217, element 1238 has surfaces 1218 and 1219, and element 1239 which is a plate has surfaces 1220 and 1221. An aperture 1240, which is listed as surface 1211 in FIG. 13, is located between the surfaces 1210 and 1212 of elements 1234 and 1235, respectively. The objective lens 112 has a long working distance to allow for fixturing and clearance of a workpiece on the image plane 114. The ten element objective lens 112 is further disclosed in copending patent application Ser. No. 07/923,283, filed on Jul. 31, 1992 entitled "Superachromatic UV and Visible Focusing Objective Lens now U.S. Pat. No. 5,305,138, issued on Apr. 19, 1994, the disclosure of which is incorporated herein by reference, and which is owned by the assignee of the present invention. Where the workpiece is in a chamber (not shown) the thickness of the plate 1239 may vary in thickness, depending on the thickness of the chamber cover.

Other objective lenses, such as the lens disclosed in IBM Technical Disclosure Bulletin, Vol. 33, No. 4, Sep. 1990, *Excimer Laser Objective Lens*, pages 206–207, may be used. Since the collimator 110 outputs a collimated beam, any infinite conjugate objective lens may be used to provide different magnification ranges with different numerical apertures from those disclosed herein.

The distances D7 (without Barlow), D11 (with Barlow), D13, D19 and DTR of FIG. 1 are varied as shown in FIG. 14 and 15 to achieve various magnifications (demagnifications) to achieve various cut sizes and energy densities. It will be understood that if the aperture 102 is opened to a relatively large opening, and the resulting beam is demagnified to a cut size, the resulting energy density will be higher than if the aperture 102 is set to a relatively smaller opening and the resulting beam is demagnified by a smaller amount to the same cut size. The ability to increase the energy density of a cut size allows the micro-machining of harder materials or performing a deeper cut of the same cut size, as desired. The aperture 102 and the demagnification of the system may also be adjusted to give different cut sizes having the same energy density, if desired. FIG. 14 shows the distance settings for magnifications of from 34.7 × to 47.89 × for one embodiment of the system wherein the Barlow lens 106 of FIG. 6 is omitted, and FIG. 15 shows the distance settings for magnifications of from 76.56× to 106.50× for another embodiment of the system wherein the Barlow lens 106 is included.

Each of the lenses of the system of FIG. 1 is color corrected such that the system is color corrected with minimal aberrations. The performance of the system is shown in FIGS. 16A through 19C for light having wavelengths of 308, 546 and 633 nanometers.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A variable magnification imaging system for focusing an object plane on an image plane comprising:
   beam shaping means for controlling an input light beam size thus effecting the divergence and energy of said light beam;
   beam edge defining means in the optical path of said beam shaping means for defining said object plane orthogonal to said light beam from said beam shaping means;
   a variable means in the optical path of said beam edge defining means for controlling the divergence and energy transfer of said light beam output through said beam edge defining means;
   optical means in the optical path of said beam edge defining means for projecting said object at variable demagnifications; and
   an objective means in the optical path of said optical means for focusing said light beam projected from said optical means on said image plane.

2. The imaging system of claim 1 wherein said beam shaping means reduces the beam size impinging on said beam edge defining means by about two times thereby increasing the average input energy density.

3. The imaging system of claim 1 wherein said defining means is a aperture having a changeable opening.

4. The imaging system of claim 3 further comprising a stepper motor connected to said aperture for stepping said aperture thereby controllably changing the opening of said aperture.

5. The imaging system of claim 1 wherein said optical means comprises:
   a thin zoom transfer lens in the optical path of said variable means, said thin zoom transfer lens for providing a range of magnifications; and
   a telephoto type collimator lens in the optical path of said thin zoom transfer lens to collimate the beam from said thin zoom transfer lens.

6. The imaging system of claim 5 wherein said thin zoom transfer lens has a first element, a second element, a third element and a fourth element, said second, third and fourth elements optically aligned with and behind said first element and movable as a unit with respect to said first element from a minimum distance to a maximum distance to provide a range of magnifications for demagnifying a light beam from said variable means.

7. The imaging system of claim 6 wherein said thin zoom transfer lens means includes means for varying the magnification of said thin zoom transfer lens in a range of about 6 × to about 8.9 ×.

8. The imaging system of claim 7 wherein said first element has first and second surfaces, said second element has third and fourth surfaces, said third element has fifth and sixth surfaces, and said fourth element has seventh and eighth surfaces, said elements and surfaces having the following characteristics:
wherein the thickness and material is the separation and material from the previous surface, respectively.

9. The imaging system of claim 8 further comprising means for varying the demagnification of the system to between 34.7 × and 47.89 ×.

10. The imaging system of claim 8 wherein said optical means further comprises:
   a Barlow lens in the optical path of said variable means before said thin zoom transfer lens, said Barlow lens having a demagnification of about 2 ×.

11. The imaging system of claim 8 further comprising means for varying the demagnification of the system to between 76.56 × and 106.50 ×.

12. The imaging system of claim 1 wherein said imaging system has means for color correction of said beam shaping means, said variable means, said optical means, and said objective means.

13. The imaging system of claim 1 wherein said imaging system has means for diffraction limiting said beam shaping means, said variable means, said optical means, and said objective means.

14. The imaging system of claim 1, wherein said light beam is a laser beam.

15. The imaging system of claim 1, wherein said system has means for color correction such that various wavelengths are focused at the same point.

16. The imaging system of claim 1, wherein said system has means to provide various energy densities and sizes of cuts.

17. The imaging system of claim 16, wherein said means to provide various energy densities and sizes of cuts is obtained from said optical path defining means and demagnification obtained from said optical path optical means.

* * * * *

UNITED STATES PATENT AND TRADEMARK OFFICE
CERTIFICATE OF CORRECTION

PATENT NO. : 5,448,410
DATED : Sep. 5, 1995
INVENTOR(S) : Candace J. Freedenberg, Frederick A. Herring, Uldis A. Ziemins It is certified that error appears in the above-indentified patent and that said Letters Patent is hereby corrected as shown below:

Column 6, In Claim 8, the following table should be inserted between "characteristics:" on line 21, and "wherein" on line 22:

| --Surface | Radius (mm) | Thickness (mm) | Clear Diameter (mm) | Material |
|---|---|---|---|---|
| first | -22.000 | | 12.00 | |
| second | 18.500 | 1.25 | 15.00 | quartz |
| third | 20.500 | 0.40 min 2.50 max | 15.00 | air |
| fourth | -18.500 | 3.80 | 15.00 | CaF$_2$ |
| fifth | 18.500 | 1.50 | 15.00 | air |
| sixth | -20.500 | 3.80 | 15.00 | CaF$_2$ |
| seventh | -18.500 | 0.40 | 12.00 | air |
| eighth | 230.000 | 1.50 | 15.00 | quartz;-- |

Signed and Sealed this

Seventh Day of January, 1997

Attest:

BRUCE LEHMAN

*Attesting Officer*   Commissioner of Patents and Trademarks